United States Patent [19]

Maeda et al.

[11] 4,176,957

[45] Dec. 4, 1979

[54] METHOD AND APPARATUS FOR OPTICALLY ANALYZING SPECIMEN BY USING TWO LIGHT BEAMS

[75] Inventors: Yoshio Maeda; Koichi Matsumoto, both of Katsuta; Kenji Fukuda, Mito; Isao Shindo, Katsuta, all of Japan

[73] Assignee: Hitachi, Ltd., Japan

[21] Appl. No.: 760,130

[22] Filed: Jan. 17, 1977

[30] Foreign Application Priority Data

Jan. 30, 1976 [JP] Japan .................................. 51-8518

[51] Int. Cl.$^2$ .............................................. G01J 3/42
[52] U.S. Cl. .................................... 356/319; 356/325
[58] Field of Search ............................ 356/82, 88–97, 356/319, 320, 323, 324, 325

[56] References Cited

U.S. PATENT DOCUMENTS

| 3,646,331 | 2/1972 | Lord | 356/96 X |
| 3,681,577 | 8/1972 | Gasiunas | 356/82 X |
| 3,734,621 | 5/1973 | Moody et al. | 356/97 X |

Primary Examiner—Vincent P. McGraw
Attorney, Agent, or Firm—Craig and Antonelli

[57] ABSTRACT

Method for optically analyzing a specimen by using two light beams comprises steps of initiating automatically wavelength scanning operation when a predetermined time has elapsed after the switching-on of a power source, sampling a ratio between a reference light intensity and a specimen light intensity during the wavelength scanning operation when no specimen to be measured is placed in the sample cell, and storing signals derived from the sampling operation in a volatile memory. When the specimen is to be measured or analyzed, the measure signal representative of ratio between the reference light intensity and the specimen transmitting light intensity which are produced or the wavelength scanning operation proceeds is corrected by the corresponding signal read out from the volatile memory in accordance with the wavelength of the measure signal, and the corrected signals are processed as the error-free measure signal.

10 Claims, 2 Drawing Figures

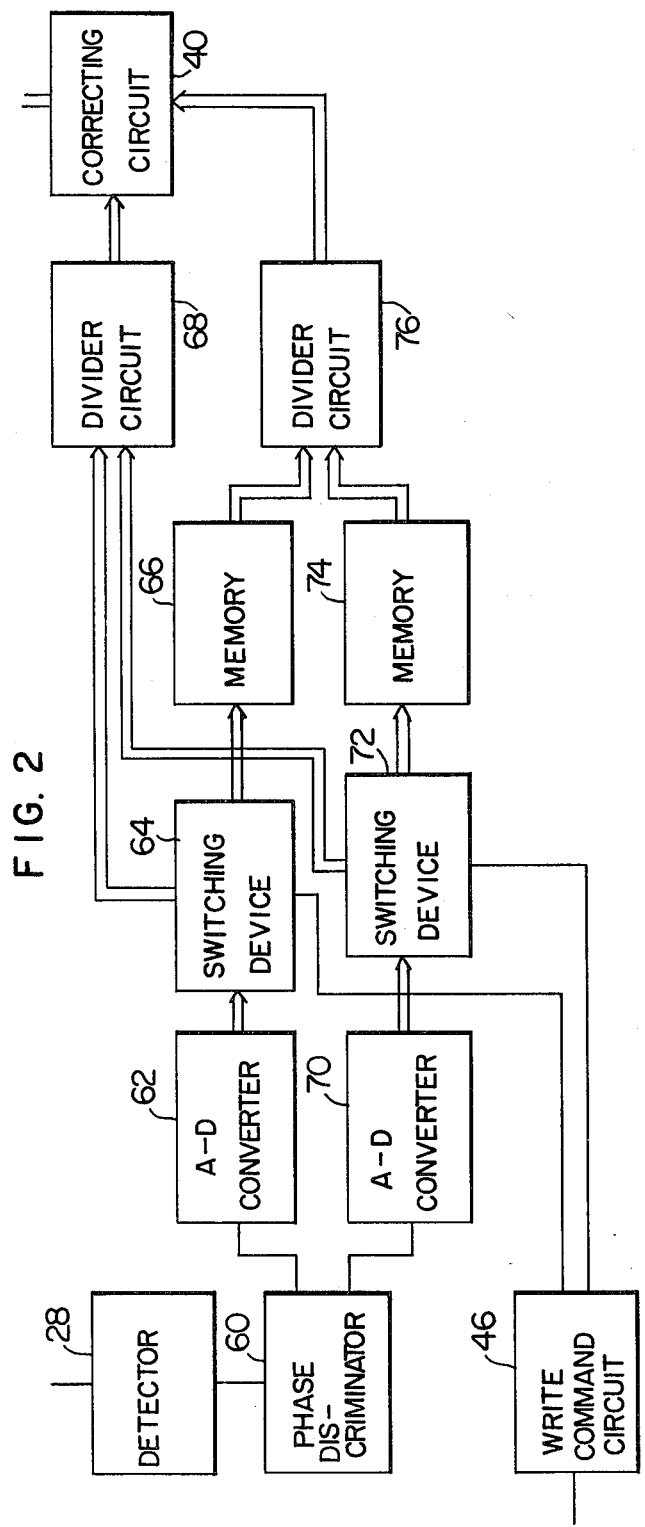

METHOD AND APPARATUS FOR OPTICALLY ANALYZING SPECIMEN BY USING TWO LIGHT BEAMS

BACKGROUND OF THE INVENTION

The present invention relates in general to spectrophotometory and in particular to a method and apparatus for optically analyzing a specimen by using two light beams, wherein variations in ratio between a reference light intensity and a specimen light intensity in dependence on the wavelengths are previously stored in a memory and the measure signal is corrected by the signal read out from the memory in accordance with the wavelength of the measure signal.

As a means for measuring the spectral transmittance or reflectance of a specimen or sample, there has been known a spectrophotometer employing two light beams. The spectrophotometer of this type is adapted to produce a light intensity ratio $I_S/I_R$ between a reference light intensity $I_R$ and a specimen transmitting light intensity $I_S$. If the reference light intensity $I_{RO}$ is equal to the specimen light intensity $I_{SO}$ when no specimen is placed in a sample cell, the ratio $I_S/I_R$ represents the transmittance or reflectance of the specimen. On the other hand, when $I_{RO}$ and $I_{SO}$ are not equal to each other, the quantity corresponding to the ratio $I_{SO}/I_{RO}$ is utilized to correct the ratio $I_S/I_R$ thereby to obtain the transmittance or reflectance of the specimen. In general, it is known that the ratio $I_{SO}/I_{RO}$ is often subjected to variations in dependence upon the variable wavelength of the light beam employed in the spectrophotometory due to differences between optical characteristics of optical elements disposed on the reference light path and that of the specimen light path or the like causes. Accordingly, it is required to store previously the ratio $I_{SO}/I_{RO}$ for every wavelength and correcting the measured ratio on the basis of the stored ratio $I_{SO}/I_{RO}$ upon measuring the specimen.

With a view to attaining such correction, it has been hitherto known that values corresponding to the ratios between the reference light intensity $I_{RO}$ and the specimen light intensity $I_{SO}$ are previously sampled and stored in a memory as the wavelength is scanned, and that ratio the between the reference light intensity $I_R$ and the specimen transmitting light intensity $I_S$ obtained during the actual measurement of the specimen is corrected by the signal which is read out from the memory in accordance with the corresponding wavelength of the measuring light beam.

The known spectrophotometer of the above described arrangement has a disadvantage that when a volatile memory is used as the storage memory, the correcting values stored therein will be erased every time the power source of the spectrophotometer is disconnected to an external power source and therefore the operator cannot avoid the trouble of having to write the correcting values in the memory every time before the measurement of the specimen is to be conducted by connecting the spectrophotometer to the power source. Such difficulty can be obviated by using a non-volatile memory, which is however very expensive and impractical from the economical view point. On the other hand, because the ratio between the reference light intensity and the specimen light intensity will vary as time elapses, it is desirable to rewrite the stored contents of the memory once a day. In this connection, when the writing-in of the correcting value relies on the operator's judgement, there may arise such undesirable case where the correct write-in operation may not carried out due to the fact that the write-in operation is initiated before the whole system becomes in a stabilized state, involving erroneous results.

SUMMARY OF THE INVENTION

Accordingly, an object of the invention is to provide a spectrophotometer of two measuring beam type which evades the drawbacks of the hitherto known technique as described above and is capable of producing a properly corrected output signal.

Another object of the invention is to provide a spectrophotometer of the above type in which the wavelength scanning operation is automatically initiated after a predetermined time required for the stabilization of the whole system has elapsed and before the measurement of the specimen, wherein the ratios between the reference light intensities and the specimen light intensities are written in a volatile memory device.

BRIEF DESCRIPTION OF THE DRAWINGS

The above and other objects, novel features as well as advantages of the invention will become more apparent from the detailed description of preferred embodiments of the invention taken in connection with the accompanying drawings in which:

FIG. 2 is a partial block diagram showing another embodiment of the invention.

DETAILED DESCRIPTION OF THE PREFERRED EMBODIMENTS

Figure 1:
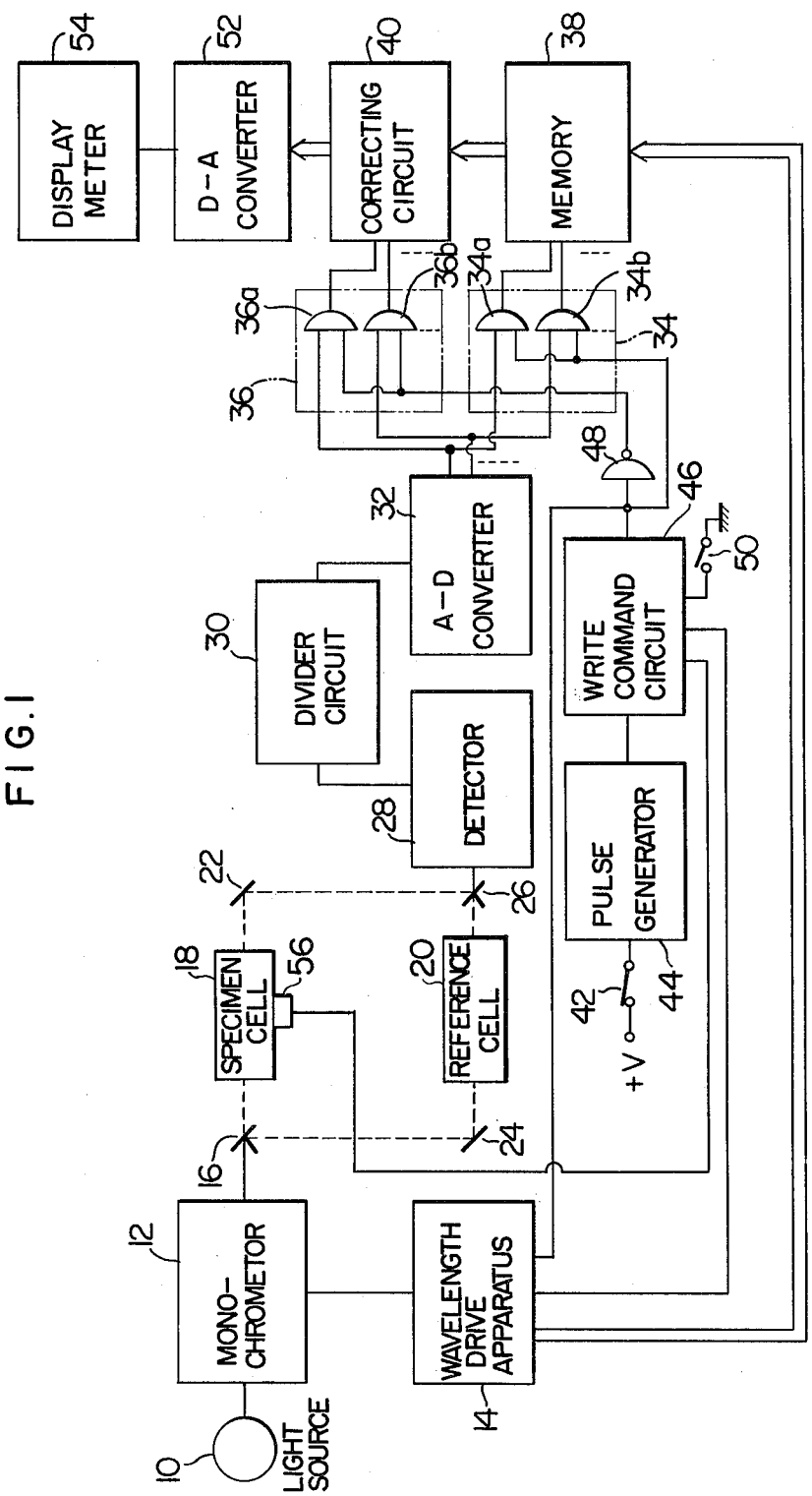
FIG. 1 is a block diagram showing a spectrophotometer according to an embodiment of the invention.

Now, the invention will be described in detail with reference to the drawings showing exemplary embodiments of the invention. Referring to FIG. 1, the light emitted from a light source 10 is converted into a monochromatic light by means of a monochromator 12. The monochromatic light from the monochromator 12. is then scanned in respect of the wavelength by a wavelength drive apparatus 14 and applied alternatively to a sample cell 18 and a reference cell 20 through a sector mirror 16. Numerals 22 and 24 designate mirrors. The light beams transmitted through the sample cell 18 and the reference cell 20 are alternatively directed to a detector 28 by way of another sector mirror 26 which is rotated in synchronism with the sector mirror 16. A divider circuit 30 serves to produce a ratio between two different output signals from the detector 28 which represent the light intensities $I_S$ and $I_R$ of the light beams transmitted through the sample cell 18 and the reference cell 20, respectively. The signal representative of the ratio is subsequently converted into a digital signal by an analog-to-digital or A-D converter 32. The individual output signal bits from the A-D converter 32 are separated into two bit groups which are fed to a first gate block 34 and a second gate block 36 and coupled to associated individual AND gates 34a, 34b, ..., 36a, 36b .... The gate output signals from the first gate block 34 are supplied to a volatile random access memory 38, while the gate output signals from the second gate block 36 are fed to a correcting circuit 40.

A switch 42 is interlocked with a main switch (not shown) so as to be turned on simultaneously with the latter. A delayed pulse generator 44 is provided to supply a pulse signal to a write command circuit 46 when a predetermined time required for the operation of the system to be stabilized has elapsed after the switch 42 was turned on. Upon reception of the pulse signal, the write command circuit 46 will initiate the operation of the wavelength drive apparatus 14 thereby to cause the monochromator 12 to perform the wavelength scanning operation and at the same time enable the individual AND gates 34a, 34b and so forth belonging to the second gate block 34. On the other hand, the individual gates 36a, 36b and so forth of the second gate block 36 will remain non-conductive, since the signal polarity is inverted by an inverter 48. In this state, signals corresponding to ratios between the specimen light intensities and the reference light intensities at various wavelengths are supplied to the input area of the memory 38 one after another, as the wavelength scanning is conducted by the wavelength drive apparatus 14, and these input signals are stored in the memory 38 at the respective addresses allotted for respective wavelengths to be sampled. When a cycle of the wavelength scanning has been completed, the wavelength drive apparatus 14 will supply a pulse signal to the write command circuit 46 thereby to invert the output signal thereof. As a result, the wavelength drive apparatus 14 will stop the wavelength scanning operation and the gates of the first gate block 34 will become non-conductive, while the gates of the second gate block 36 are made conductive.

The write-in operation of the intensity ratios between the specimen transmitting light beam and the reference light beam into the memory 38 is conducted in the condition in which no specimen is placed into the sample cell. In other words, the signals representative of the sampled wavelengths corresponding to the ratio $I_{SO}/I_{RO}$ between the light intensity $I_{SO}$ derived from the sample cell containing no specimen and the reference light intensity $I_{RO}$ are written in the memory. A switch 50 allows the signals corresponding to the ratio $I_{SO}/I_{RO}$ to be written in the memory 38 when occasion requires, as the wavelengths are scanned. In other words, the switch 50 can be temporarily turned on thereby to initiate the wavelength scanning and write-in operations.

After the write-in operation in the memory 38 described above has been completed, a specimen to be analyzed is placed in the sample cell 18 and a manually operatable switch (not shown) is actuated so as to cause the wavelength drive apparatus 14 to conduct again the wavelength scanning operation. Then, the measure signals corresponding to the ratios $I_S/I_R$ between the specimen transmitting light intensity $I_S$ and the reference light intensity $I_R$ are input to the correcting circuit 40 through the second gate block 36 one after another, as the wavelengths of these light beams are scanned by the wavelength drive apparatus 14. At the same time, the addressing signals allotted for the respective wavelengths from the wavelength drive apparatus 14 are supplied to the memory 38, and the ratio $I_{SO}/I_{RO}$ signals (correcting signals) corresponding to the wavelengths of light beams already transmitted through the idle sample cell 18 and the reference cell 20 and stored in the memory 38 as hereinbefore described are read out at the output area of the memory 38. The correcting circuit 40 serves to correct the measure signals fed from the second gate block 36 with the correcting signals $I_{SO}/I_{RO}$ from the memory 38. The corrected measure signals are then supplied to a digital-to-analog or D-A converter 52. The correcting circuit 40 is so arranged as to perform the correcting function thereof by dividing the measure signal $I_S/I_R$ by the correcting signal $I_{SO}/I_{RO}$. The D-A converter converts the corrected signal from the correcting circuit 40 into the corresponding analog signal which can be visibly displayed at a display meter 54.

It may occur that, even if specimen is placed in the sample cell 18, if the main switch of the system is turned on, after a predetermined time duration has elapsed, the wavelength drive apparatus 14 brings about the wavelength scanning operation as well as the write-in operation for every wavelength in the memory 38 under the command of the write command circuit 46. In this connection, it is to be noted that the operation of the write command circuit 46 in the state in which the specimen has been initially present in the sample cell 18 is an erroneous operation, since it is intended in accordance with the invention to write in the memory 38 the signals for the wavelengths derived from the sample cell 18 in which no specimen is present. With a view to preventing such erroneous operation, a specimen sensor 56 is provided according to the invention to determine the presence or absence of the specimen in the cell 18 and the write command circuit 46 is adapted to be not operated when the presence of specimen in the cell 18 is detected by the sensor 56.

In the above described embodiment, the ratio between the signals representative of the specimen transmitting light intensity and the reference light intensity is obtained by the divider circuit 30. However, it is also possible to obtain logarithms of the above ratios. In such case, the correcting circuit 40 will function as a subtractor circuit to subtract the read-out signal of the memory 38 from the output signals of the second gate block 36.

Further, it is assumed in the above description that the detector 28 is adapted to detect both the specimen transmitting light intensity and the reference light intensity and the signals representative of the ratios of these intensities are stored in the memory 38 after having been converted into corresponding digital signals by the A-D converter 38. However, the invention is never restricted to such arrangement. For example, as is shown in FIG. 2, it is also possible to separate the output of the detector 28 into the specimen light signal and the reference light signal by means of a phase discriminator 60 interlocked with the sector mirrors 16 and 26, wherein the specimen light signal is supplied to a switching device 64 after having been converted into the corresponding digital signal through an A-D converter 62, which switching device 64 will then supply the specimen light signal either to the volatile memory 66 or to divider circuit 68 under the command of the write command circuit 46. In a similar manner, the channel for processing the reference light intensity includes an A-D converter 70, a switching device 72 and a volatile memory 74. When the switching devices 64 and 72 are changed over to the divider circuit 68, the ratio of the two signals is produced and fed to the correcting circuit 40. Signals as read out from the memories 66 and 74 are applied to the divider circuit 76, whereby the ratio of these signals is produced and supplied to the correcting circuit 40.

It will be appreciated that, according to the invention, the operator gets rid of the trouble of having to write the correcting values in the volatile memory every time the power source is turned on. Further, since the correcting values can be written in the volatile memory in the stabilized state of the whole system, it is

What is claimed:

1. A method for optically analyzing a speciment by using two light beams, comprising the steps of automatically initiating a wavelength scanning operation of a monochromator after a power source has been turned on and when a predetermined time required to stabilize the operation of the system has elapsed, sampling a signal representative of the ratio between a specimen light intensity and a reference light intensity in the state in which no specimen to be measured is yet disposed at a measuring position during the period of the wavelength scanning and storing the sampled ratio signal in a volatile memory, obtaining a measure signal representative of ratio between the specimen light intensity and said reference light intensity during the wavelength scanning period by means of said monochromator in the state in which said speciment to be measured is disposed at the measuring position, and correcting and processing said measure signal with the signal read out from said volatile memory in accordance with the wavelength of said measure signal.

2. A method as set forth in claim 1, wherein a value of the ratio between said reference light intensity and said specimen light intensity as measured when no specimen is disposed at the measuring position is stored in said volatile memory, and the measure signal representative of the value of ratio between said reference light intensity and the specimen light intensity measured when said specimen is disposed at said measuring position is corrected through division by the signal read out from said volatile memory in accordance with the wavelength of said measure signal.

3. A method as set forth in claim 1, wherein logarithmic value of the ratio between said reference light intensity and the specimen light intensity as measured when no specimen is disposed at the measuring position is stored in said volatile memory, and a measure signal representative of logarithmic value of the ratio between said reference light intensity and the specimen light intensity as measured when the specimen is disposed at the measuring position is corrected by subtracting therefrom the signal read out from said volatile memory in accordance with the wavelength of the measure signal.

4. A method as set forth in claim 1, wherein said signal representative of the ratio between said reference light intensity and said specimen light intensity is sampled and stored in said volatile memory only when absence of said specimen to be measured at the measuring position is detected at the initiation of said wavelength scanning operation of said monochromator as caused by turning on said power source.

5. A method for optically analyzing a specimen by using two light beams, comprising steps of automatically initiating a wavelength scanning operation of a monochromator after a power source has been turned on and when a predetermined time required to stabilize the operation of the system has elapsed, sampling two electric signals representing, respectively, a reference light intensity and a specimen light intensity measured in the state in which no specimen to be measured is disposed at the measuring position during said wavelength scanning period and storing the sampled signals in a volatile memory, producing a measure signal representative of a ratio between said reference light intensity and said specimen light intensity measured during the wavelength scanning period conducted after the specimen has been disposed at the measuring position, and correcting and processing said measure signal with the value of ratio between said two signals read out from said volatile memory in accordance with the wavelength of said measure signal.

6. A double beam spectrophotometer comprising a light source, a monochromator for selecting monochromatic light from radiation emitted by said light source, a wavelength drive means for causing said monochromator to perform the wavelength scanning operation, means for dividing said monochromatic light into a specimen light beam and a reference light beam, means for detecting a signal corresponding to a ratio of intensities between said specimen light and said reference light, an A-D converter for converting the signal from said detecting means into a digital signal, volatile memory means for storing the output signal from said A-D converter, correcting means for correcting the output signal from said A-D converter with the signal read out from said volatile memory means in accordance with the wavelength of said output signal, means for processing the output signal from said correcting means, switching means for selectively coupling the output signal from said A-D converter either to the input of said volatile memory means or to the input of said correction means, and means for sensing the turning on of a power source of the spectrophotometer thereby to initiate said wavelength drive means for causing said monochromator to perform the wavelength scanning operation after the turning-on of said power source has been detected and when a predetermined time required to stabilize the operation of the system has elapsed, wherein said switching means is adapted to couple the output signal of said A-D converter to the input of said memory at least during the time when said monochromator is scanning the wavelength in accordance with a command of said sensing means for detecting the turn-on of said power source and to couple said output signal from said A-D converter to the input of said correcting means during the time when the specimen is measured.

7. A spectrophotometer as set forth in claim 6, wherein said switching means comprises two gate blocks, and the output of said A-D converter is separated into two outputs each coupled to each of the associated inputs of said gate blocks, the outputs of said gate blocks in turn being coupled to said volatile memory means and said correcting means, respectively.

8. A spectrophotometer as set forth in claim 7, wherein said gate blocks are adapted to couple the output of said A-D converter to the input of said volatile memory means during the wavelength scanning operation initiated by the output of said sensing means for detecting the turn-on of said power source.

9. A spectrophotometer as set forth in claim 6, wherein addressing signals for writing in and reading out from said volatile memory means are produced by said wavelength drive means.

10. A spectrophotometer as set forth in claim 6, further comprising means for initiating operation of said wavelength drive means and for coupling the output of said A-D converter to the input of said volatile memory means in order to write a new signal at a given time.